(12) United States Patent
Rose et al.

(10) Patent No.: US 7,488,943 B2
(45) Date of Patent: Feb. 10, 2009

(54) PET DETECTOR METHODS AND APPARATUS

(75) Inventors: Timothy Patrick Rose, Waukesha, WI (US); Nicholas Ryan Konkle, Wauwatosa, WI (US); Ashutosh Joshi, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/488,108

(22) Filed: Jul. 17, 2006

(65) Prior Publication Data

US 2008/0011950 A1 Jan. 17, 2008

(51) Int. Cl.
*G01T 1/166* (2006.01)
(52) U.S. Cl. ................................. 250/363.04
(58) Field of Classification Search ............ 250/339.03, 250/363.04
See application file for complete search history.

(56) References Cited

U.S. PATENT DOCUMENTS 5,764,715 A * 6/1998 Maenchen et al. .......... 376/201
5,773,829 A * 6/1998 Iwanczyk et al. ........... 250/367
5,788,940 A * 8/1998 Cicha et al. .................. 422/24
6,586,744 B1 * 7/2003 Griesmer et al. ....... 250/370.15
6,624,422 B2   9/2003 Williams et al. ....... 250/363.09
6,858,850 B2   2/2005 Williams et al. ....... 250/363.09
2004/0071259 A1 * 4/2004 Lacey et al. .................. 378/19
2004/0075059 A1 * 4/2004 Serebryanov et al. .. 250/370.15
2004/0178348 A1 * 9/2004 Wainer et al. .......... 250/370.09
2005/0067579 A1 * 3/2005 Tsuchiya et al. ....... 250/370.15
2005/0117698 A1 * 6/2005 Lacey et al. .................. 378/19
2006/0239415 A1 * 10/2006 Liu et al. ..................... 378/207
2006/0241386 A1 * 10/2006 Yanagita et al. ............. 600/415
2007/0080296 A1 * 4/2007 Ueno et al. ............. 250/363.04
2007/0089484 A1 * 4/2007 Bailey et al. ................ 73/23.42

\* cited by examiner

*Primary Examiner*—David P Porta
*Assistant Examiner*—Marcus H Taningco
(74) *Attorney, Agent, or Firm*—Fisher Patent Group, LLC; Thomas M. Fisher

(57) ABSTRACT

A method includes controlling a PET detector temperature at a constant temperature.

19 Claims, 4 Drawing Sheets

| Detector | TIM | Heat spreading plate | TIM | TEC | Heat sink and/or fan |
|---|---|---|---|---|---|
| 114 | 122 | 115 | 122 | 112 | 124 |

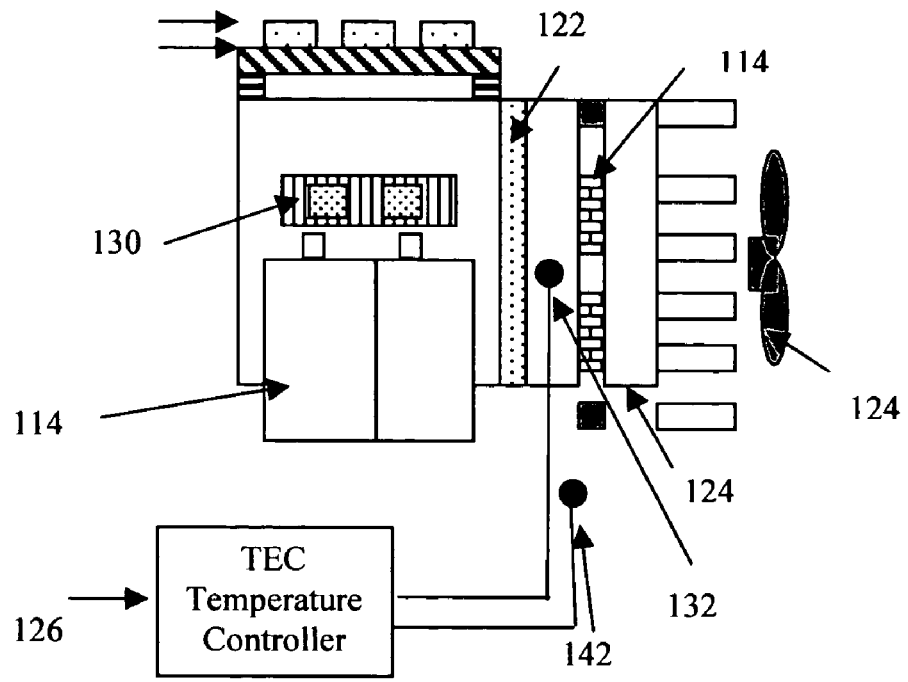
FIG. 5
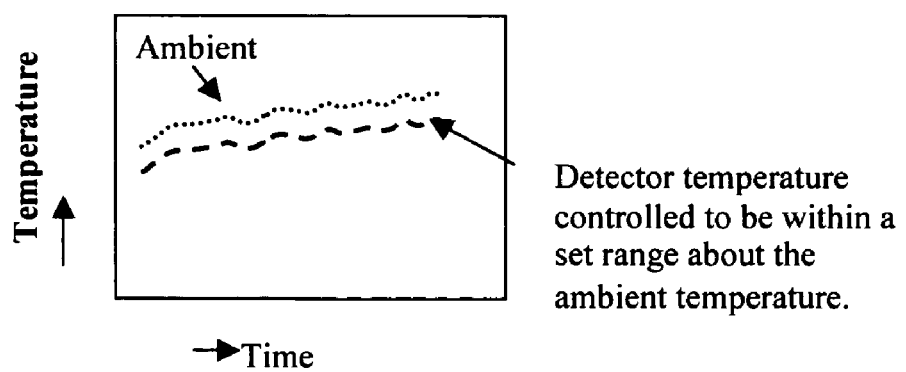
FIG. 6 Temperature profile (ambient tracking control)

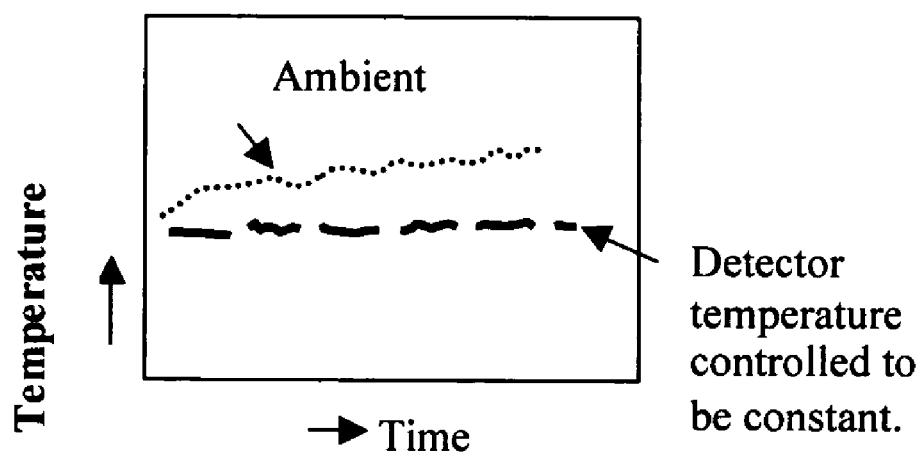
FIG. 7: Temperature profile (constant temperature detector)

PET DETECTOR METHODS AND APPARATUS

BACKGROUND OF THE INVENTION

This invention relates generally to Diagnostic Imaging (DI) detectors, and, more particularly, to PET detectors.

In PET (Positron Emission Tomography) imaging systems, PET detector assemblies are mounted in a 360 arc around the patient to collect coincident events that occur from a radio-active tracer given to the affected patient. The gamma radiation is converted into a small electrical signal through a detector module assembly and then post-processed to form an image of the patient. The detector assembly on the PET system is extremely thermally sensitive and can change its signal gain and characteristics with temperature fluctuations of the individual components that make up the detector assembly. These characteristic changes from thermal variance can result in a degradation of image quality if not properly monitored and accounted for in the signal acquisition path.

The next generation PET systems will have varying degrees of electronics placed in close approximation to the detector assembly in order to drive signal to noise ratio as high as possible. This creates an inherent problem, as this will place heat sources near or around the detector assembly that will create gradients and or thermal changes within the detector materials that could result in degradation of image quality.

Therefore, there is a need to manage the thermal load near or around the detector assembly in order to maintain near constant temperature regardless of ambient or external factors that could result in thermal gradients.

BRIEF DESCRIPTION OF THE INVENTION

In one aspect, a method includes controlling a PET detector temperature at a constant temperature.

In another aspect, a method includes performing at least one of the following: a) attempting to maintain a PET detector at a constant temperature and notifying a user when the temperature is not maintainable; and b) reducing or eliminating condensation on the PET detector by controlling the temperature of the detector.

In yet another aspect, a PET system is provided. The PET system includes an imaging volume configured to receive an object to be scanned, at least one PET detector positioned to receive at least one gamma ray emitted from the object, and a cooling device thermally coupled to the PET detector.

BRIEF DESCRIPTION OF THE DRAWINGS

FIG. 5 is a side view of the assembly of FIGS. 3 and 4.

FIG. 6 illustrates the controller maintaining the temperature of the detector within a range around the ambient temperature to reduce or eliminate moisture condensation.

FIG. 7 illustrates the controller maintaining the temperature of the detector at a constant temperature.

DETAILED DESCRIPTION OF THE INVENTION

There are herein described PET detector methods and apparatus. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of PET, it is contemplated that the benefits of the invention accrue to all system with PET capabilities such as a combined PET/CT system.

Figure 1:
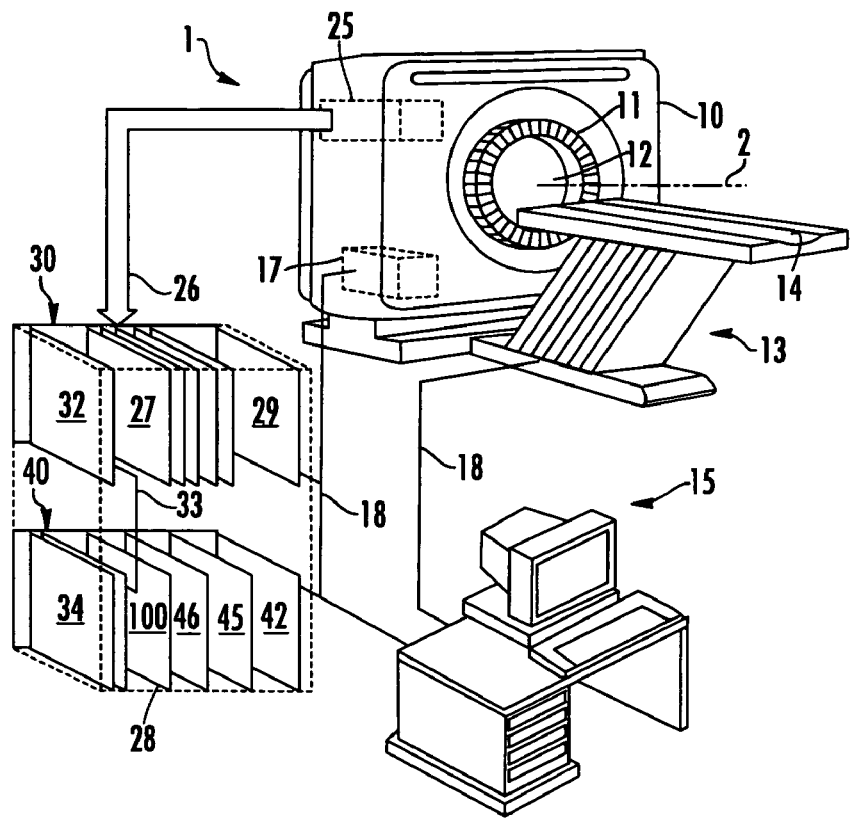
FIG. 1 is a drawing of an imaging system according an exemplary embodiment of the invention.

FIG. 1 illustrates a PET scanner 1 that includes a gantry 10 supporting a detector ring assembly 11 about a central opening or bore 12. The detector ring assembly 11 is circular in shape and is made up of multiple detector rings (not shown) that are spaced along a central axis 2 to form a cylindrical detector ring assembly. According to one embodiment, the detector ring assembly 11 includes twenty-four detector rings spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator workstation 15 through a communications link. A gantry controller 17 is mounted within the gantry 10 and is responsive to commands received from the operator workstation 15 through a second communication link 18 to operate the gantry.

Figure 2:
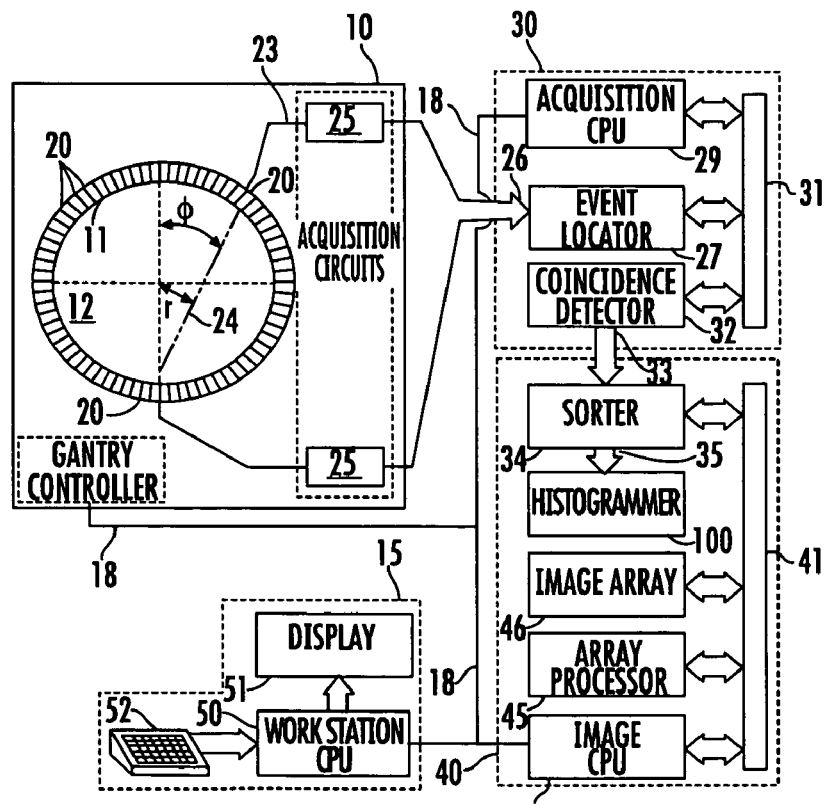
FIG. 2 is a schematic diagram of the imaging system of FIG. 1.

As shown in FIG. 2, the operator workstation 15 includes a central processing unit (CPU) 50, a display 51, and a keyboard 52. Through the keyboard 52 and associated control panel switches, the operator can control the calibration of the PET scanner, its configuration, and the positioning of the patient table for a scan. Similarly, the operator can control the display of the resulting image on the display 51 and perform image enhancement functions using programs executed by the workstation CPU 50.

The detector ring assembly 11 is comprised of a number of detector modules. According to one embodiment, the detector ring assembly 11 comprises thirty-six detector modules, where each detector module comprises eight detector blocks. The eight detector blocks 20 in a detector module can be arranged in a 2*4 configuration such that the circumference of the detector ring assembly 11 is 72 detector blocks around, and the width of the detector ring 11 assembly is 4 detector blocks wide. Each detector block 20 typically comprises a number of individual detector crystals.

Each detector crystal may comprise a scintillator formed, for example, of lutetium oxyorthosilicate (LSO) or lutetium-yttrium oxyorthosilicate (LYSO) or the like. The 36 detector crystals in the block 20 are disposed in front of four photo-multiplier tubes (PMTs). Each PMT produces an analog signal which rises sharply when a scintillation event occurs then tails off exponentially. The position in the 6*6 detector crystal matrix at which the scintillation event took place determines the relative magnitudes of the analog signals, and the energy of the gamma ray which caused the event determines the total magnitude of these signals.

As shown in FIG. 2, a set of acquisition circuits 25 is mounted within the gantry 10 to receive the four signals from each of the detector blocks 20 in the detector ring assembly 11. The acquisition circuits 25 determine the event coordinates within the block of detector crystals 21 by comparing the relative signal strengths as follows:

$$x=(A+C)/(A+B+C+D)$$

$$z=(A+B)/(A+B+C+D)$$

These coordinates (x,z), along with the sum of all four signals (A+B+C+D) are then digitized and sent through a cable 26 to an event locater circuit 27 housed in a separate cabinet 28. Each acquisition circuit 25 also produces an event detection pulse (EDP) that indicates the exact moment the scintillation event took place. Of course, the above-described configuration of detector crystals, detector blocks, and detector modules is merely an example. Other configurations, scintillators, sizes, and numbers of detector crystals, blocks, and modules can be used, as will be appreciated by those skilled in the art.

The event locator circuits 27 form part of a data acquisition processor 30 that periodically samples the signals produced by the acquisition circuits 25. The data acquisition processor 30 has an acquisition CPU 29 that controls communications on the local area network 18 and a bus 31. The event locator circuits 27 assemble the information regarding each valid event into a set of digital numbers that indicate precisely when the event took place and the position of the detector crystal that detected the event. The event data packets are transmitted to a coincidence detector 32 that is also part of the data acquisition processor 30.

The coincidence detector 32 accepts the event data packets from the event locator circuits 27 and determines if any two of them are in coincidence. Coincidence is determined by a number of factors. First, the time markers in each event data packet must be within a specified time period of each other, e.g., 12.5 nanoseconds, and second, the locations indicated by the two event data packets must lie on a straight line which passes through the field of view (FOV) in the scanner bore 12. Events that cannot be paired are discarded, but coincident event pairs are located and recorded as a coincidence data packet that is transmitted through a serial link 33 to a sorter 34. The format of the coincidence data packet may be, for example, a multi bit data stream that includes, among other things, digital numbers that precisely identify the locations of the two detector crystal pairs that detected a given event. For a detailed description of an example of a coincidence detector 32, reference is made to U.S. Pat. No. 5,241,181 entitled "Coincidence Detector For A PET Scanner."

The sorter 34, which may comprise a CPU and which forms part of an image reconstruction processor 40, receives the coincidence data packets from the coincidence detector 32. The function of the sorter 34 is generally to receive the coincidence data packets and to generate from them memory addresses for the efficient storage of the coincidence data. The sorter 34 outputs a stream of histogram events to a histogrammer 100 downstream of the sorter via an interconnect 35 such as a memory bus.

According to one embodiment, the sorter 34 defines the coincidence events conversion to sinogram space with respect to a projection plane format using four variables, r, z, $\theta$, and $\phi$. As shown in FIG. 2, the variables r and $\phi$ identify a plane 24 that is parallel to the central Z axis 2 of the detector, with $\phi$ specifying the angular direction of the plane 24 with respect to a reference plane and r specifying the distance from the central Z axis 2 to the plane 24 as measured perpendicular to the plane 24. The variable $\theta$ defines an axial view angle parameter measured from the Y-axis. The variable $\theta$ is used to define coincidence events involving detector crystals from different rings. The value of $\theta$ varies according to the separation distance of the two rings that detected a particular coincidence event. The value z specifies the location in the z direction of the midpoint between two different detector rings detecting a coincidence event.

The projection plane variables, r, z, $\theta$, and $\phi$ define the possible propagation paths taken by a pair of oppositely traveling gamma rays from an annihilation event to a pair of detector crystals. These propagation paths are commonly referred to as "lines of response" (LORs). Coincidence events occur at random, and the projection plane variables r, z, $\theta$, and $\phi$ can be used to sort or organize the coincidence events according to LOR, i.e., the direction of the gamma rays that generated the coincidence event. Ultimately, the coincidence events can be stored in a histogram organized in a logical order based on the projection plane variables r, z, $\theta$, and $\phi$ that define the LORs.

As will be appreciated by those skilled in the art, the sorter 34 can generate output data in other data formats, such as a set of sinogram arrays using only the variables r, $\phi$ and z. In such case, the result histogram, i.e., the histogram containing all the data from the scan, could be in the form of a three-dimensional array based on the variables r, $\phi$ and z. For a detailed description of an example of a sorter, reference is made to U.S. Pat. No. 5,272,343 entitled "Sorter for Coincidence Timing Calibration in a PET Scanner."

In one embodiment, system 1 includes a device for data storage, for example, a floppy disk drive, CD-ROM drive, DVD drive, magnetic optical disk (MOD) device, or any other digital device including a network connecting device such as an Ethernet device for reading instructions and/or data from a computer-readable medium, such as a floppy disk, a CD-ROM, a DVD or an other digital source such as a network or the Internet, as well as yet to be developed digital means. In another embodiment, the computer executes instructions stored in firmware (not shown). Generally, a processor is programmed to execute the processes described herein. Of course, the methods are not limited to practice in PET and the herein described methods and apparatus can be utilized in connection with many other types and variations of imaging systems such as a combined PET/CT system. In one embodiment, the computer is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, field programmable gate arrays (FPGA), and other programmable circuits. Although the herein described methods are described in a human patient setting, it is contemplated that the benefits of the invention accrue to non-human imaging systems such as those systems typically employed in small animal research.

The herein described methods and apparatus manage the temperature of the PET detector assembly and keep it at a constant temperature regardless of ambient condition or other external heat loads near the detector assembly. One embodiment uses thermo-electric coolers to control the temperature of the detector assemblies to a constant value. The existing detector assembly mounts on an aluminum frame via the use of a gluing fixture. One embodiment couples this detector frame to a heat spreading cold plate. This cold plate may be precisely machined on both the front and rear mounting surfaces to accommodate mounting of the detector assemblies as well as the Thermo-Electric coolers (TECs). Then, thermal interface material may be used to enable efficient heat transfer between the TEC and the backside of the cold plate and also between the front side of the cold plate and the detector frame. A distribution of TECs around the ring may enable proper spreading of heat from the cold plate to the detector assemblies. This may enable control of the PET detector assemblies by setting the cold side of the TEC to a temperature and then having a feedback loop in place to monitor the temperature and control the TEC off this temperature. The thermal resistances and loads may be managed by the controller on the TEC thus enabling near constant temperature control of the PET Detector assemblies.

Figures 3, 4:
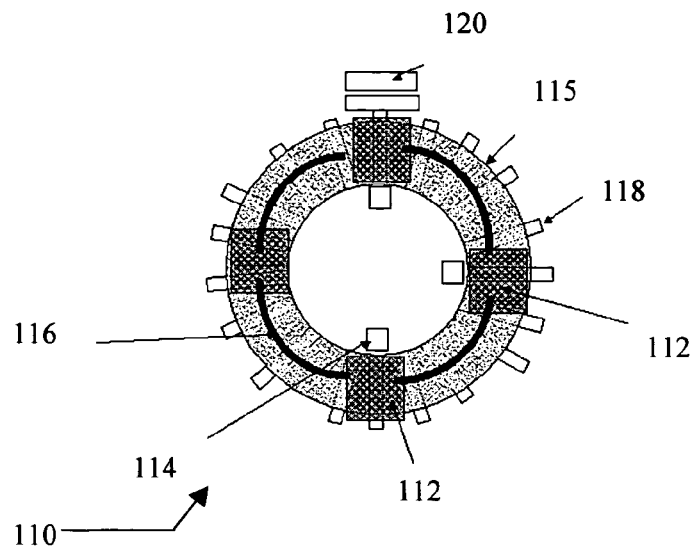
FIG. 3 illustrates one embodiment of controlling the temperature of a PET detector assembly.
FIG. 4 schematically illustrates the assembly of FIG. 3.

FIG. 3 illustrates one embodiment of controlling the temperature of a PET detector assembly 110. Assembly 110 includes a plurality of TECs 112 each with single point control. Each TEC 112 is in thermal communication with a detector 114 that extends 360 degrees however only three crystals of the detector are shown in FIG. 3. Assembly 110 also includes a heat spreading plate 115 such as an aluminum plate. A heat pipe 116 is embedded in the plate 115. Heat pipe 116 acts to transfer heat to equalize the detector temperature such that there is little gradient between portions closer to a TEC 112 and portions further distanced from the TEC 112. A plurality of T-brackets 118 hold together the PET detector blocks and keep them aligned properly. The T-brackets also interface the detector blocks to the heat spreader. A cooling apparatus 120 may be provided to cool the hot side of the TECs. Cooling apparatus may be a heat tube/pipe, a fan, a vent, a heat sink, or any other known cooling devices.

FIG. 4 schematically illustrates the assembly 110 of FIG. 3. In one embodiment, a thermal interface material (TIM) 122 is positioned between the detector 114 and the heat spreading plate 115. Additionally or alternatively, TIM 122 may be positioned between the heat spreading plate and the TEC 112. A heat sink and/or a fan 124 may be used to facilitate the TEC discharging heat from its hot side.

FIG. 5 is a side view of FIGS. 3 and 4 wherein a TEC temperature controller 126 controls the temperature of the TECs 112 based upon the measured temperature from a control temperature sensor 132 in thermal communication with the TECs 112 and the detector 114. An ambient temperature sensor 142 provides the temperature of the air around system 1. Controller 126 may be PID (Proportional-Integral-Derivative) control. In this embodiment, both a fan 124 and a heat sink 124 are provided. A bleeder card 130 is provided that dissipates heat.

FIG. 6 illustrates the controller 126 maintaining the temperature of the detector 114 within a range around the ambient temperature to reduce or eliminate moisture condensation. In one embodiment, a user of system 10 is allowed to select a user entered range. Additionally, in one embodiment, a heater is used in conjunction with TEC 112 such that even in cold environments, the temperature is maintained within a range about the ambient temperature. In an embodiment dedicated to cold temperature scanning, the heater is present but no cooler is present.

FIG. 7 illustrates the controller 126 maintaining the temperature of the detector 114 at a constant temperature. Because a "constant temperature" does not really exist in real life, the term constant temperature means within a few degrees centigrade or Fahrenheit.

In different embodiments, the detector assembly is directly mounted to a heat spreading cold plate section. This may provide a detector alignment capability off of the cold plate section as well as providing a thermal path to the PET detector assembly.

By using a thermo-electric cooler that is coupled to the cold plate section, the thermoelectric cooler may be bolted to the cold plate section thus enabling control of the PET detector assembly temperature.

By controlling the PET Detector to a specified temperature regardless of ambient temperature of the PET system, the need for calibrations by the customer due to thermal gradients is eliminated, since thermal gradients would be eliminated from the PET detectors.

Technical effects include that TECs enable control of the detector assemblies to a chosen temperature eliminating drift in gain or signal to noise ratio from thermal induced gradients. TECs prevent un-necessary and time-consuming customer required calibrations that could occur if the PET detector temperature would drift beyond an allowable range. TECs enable cooling of the PET detector temperature to a value below ambient thus creating more signal to noise ratio than in a case where the PET detector assembly is simply kept at a value near ambient temperature.

The heat pipes on the heat spreader plate will minimize the temperature difference between the module near the control point and away from control point.

The herein described methods and apparatus make the detector temperature control insensitive to the circuit board heat and bleeder heat (maintaining at near constant temperature).

The herein described methods and apparatus are insensitive to gravity effect (all modules can be maintained at low temperature gradient between modules).

The herein described methods and apparatus also eliminate the effect of moisture condensation by tracking ambient and control temperature to a small difference and eliminating moisture on electronics.

One embodiment, in order to reduce any temperature gradient in the spreader plate, is the use of a graphite sandwich spreader.

The herein described methods and apparatus are relatively easy to implement and cost effective. They also manage the electronics heat that is dissipated near or around the PET detector and do not require any additional cooling solutions (i.e. fans, water cooling, etc.).

Technical effects also include (1.) Controlling the PET detector assembly to a specified value through the use of thermoelectric coolers coupled to a cold plate. (2.) Managing the heat flow from the electronics near the thermally sensitive PET detector by the use of a thermoelectric cooler. (3.) Having a thermal path or thermal coupling from the PET detector assembly to a cold plate section allowing the use of a thermoelectric cooler for controlling PET detector temperature. (4.) Spreading the constant temperature to multiple modules using either heat pipe embedded spreader plate or graphite sandwiched plate (higher planar thermal conductivity) or hybrid of the two. And (5.) Eliminating customer required calibrations due to thermal gradients of the PET detector.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A method comprising:
attempting to maintain a PET detector at a constant temperature using a (Proportional-Integral-Derivative) PID control and within a user entered range such that calibrating for thermal gradient on the PET detector is not done and notifying a user when the temperature is not maintainable.

2. A method in accordance with claim 1 wherein said attempting comprises using a Thermo-Electric Cooler (TEC).

3. A method in accordance with claim 2 wherein said using comprises placing the TEC in thermal communication with a heat spreading plate that the detector is also in thermal communication with.

4. A method in accordance with claim 3 wherein a thermal interface material is positioned between the heat spreading plate and the TEC, and/or between the heat spreading plate and the detector.

5. A method in accordance with claim 3 wherein the heat spreading plate is a graphite sandwiched heat spreading plate.

6. A method in accordance with claim 5 wherein a thermal interface material is positioned between the graphite sandwiched heat spreading plate and the TEC, and between the graphite sandwiched heat spreading plate and the detector.

7. A method in accordance with claim 6 further comprising using temperature control to eliminate or reduce condensation on the detector.

8. A method in accordance with claim 7 further comprising monitoring an ambient temperature.

9. A method in accordance with claim 1 further comprising using temperature control to eliminate or reduce condensation on the detector.

10. A method in accordance with claim 9 further comprising monitoring an ambient temperature.

11. A PET system comprising:
   an imaging volume configured to receive an object to be scanned;
   at least one PET detector positioned to receive at least one gamma ray emitted from the object; and
   a cooling device thermally coupled to said PET detector and configured to maintain the detector at a constant temperature and within a user entered range such that calibrating for thermal gradient on the PET detector is not done.

12. A system in accordance with claim 11 wherein said cooling device is a Thermo-Electric Cooler (TEC) operationally coupled with a bleeder board.

13. A system in accordance with claim 12 wherein the TEC is in thermal communication with a heat spreading plate that the detector is also in thermal communication with and the TEC is controlled by a (Proportional-Integral-Derivative) PID control.

14. A system in accordance with claim 13 wherein a thermal interface material is positioned between the heat spreading plate and the TEC, and between the heat spreading plate and the detector.

15. A system in accordance with claim 14 further comprising a computer operationally coupled to said detector and said TEC, said computer configured to use temperature control to eliminate or reduce condensation on said detector.

16. A system in accordance with claim 15 wherein said computer configured to monitor an ambient temperature.

17. A system in accordance with claim 13 wherein said heat spreading plate is a graphite sandwiched heat spreading plate.

18. A system in accordance with claim 17 wherein a thermal interface material is positioned between said graphite sandwiched heat spreading plate and said TEC, and between said graphite sandwiched heat spreading plate and said detector.

19. A system in accordance with claim 17 further comprising a computer operationally coupled to said detector and said TEC, said computer configured to:
   monitor an ambient temperature; and
   use temperature control to eliminate or reduce condensation on said detector.

* * * * *